(12) United States Patent
Poisner et al.

(10) Patent No.: US 9,950,248 B2
(45) Date of Patent: Apr. 24, 2018

(54) ELECTRONIC PUZZLES

(71) Applicant: Intel Corporation, Santa Clara, CA (US)

(72) Inventors: David I. Poisner, Carmichael, CA (US); Yuri I. Krimon, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 95 days.

(21) Appl. No.: 14/866,352

(22) Filed: Sep. 25, 2015

(65) Prior Publication Data

US 2017/0087448 A1    Mar. 30, 2017

(51) Int. Cl.
*A63F 9/06* (2006.01)
*G07C 9/00* (2006.01)
(Continued)

(52) U.S. Cl.
CPC ............ *A63F 9/0612* (2013.01); *A63F 13/71* (2014.09); *G06F 21/31* (2013.01); *G06F 21/86* (2013.01); *G07C 9/00174* (2013.01); *G07C 9/00896* (2013.01); *A63F 13/79* (2014.09); *A63F 2009/2432* (2013.01); *A63F 2009/2442* (2013.01); *A63F 2009/2444* (2013.01); *A63F 2250/24* (2013.01)

(58) Field of Classification Search
CPC .......... A63F 9/24; A63F 9/0612; A63F 13/71; A63F 2250/24; A63F 2009/2444; A63F 2009/2442; A63F 2009/2432; G07C 9/00896; G07C 9/00174; G06F 21/31; G06F 21/86
See application file for complete search history.

(56) References Cited

U.S. PATENT DOCUMENTS

| | | | | |
|---|---|---|---|---|
| 5,479,151 A | * | 12/1995 | Lavelle | E05B 65/108 |
| | | | | 292/251.5 |
| 8,508,335 B1 | * | 8/2013 | Hart | G08C 17/02 |
| | | | | 340/5.73 |

(Continued)

FOREIGN PATENT DOCUMENTS

CN          101690847 A   *   9/2009   ............... A63F 9/08

OTHER PUBLICATIONS

Futuro Cube: Motion Controlled Gaming Cube, http://www.futurocube.com (last visited on Apr. 13, 2016).

(Continued)

*Primary Examiner* — Joseph P Hirl
*Assistant Examiner* — Hassan Saadoun
(74) *Attorney, Agent, or Firm* — Barnes & Thornburg LLP (57) ABSTRACT

A computing system of an electronic puzzle includes a memory, an electronically controlled lock, and a plurality of sensors to generate sensor data. The computing system controls the electronically controlled lock to regulate access to an inner chamber of the electronic puzzle and monitors the sensor data generated by the plurality of sensors. The computing system generates an input password based on the monitored sensor data, compares the input password to a puzzle password stored in the memory, and unlocks the electronically controlled lock to permit access to the inner chamber in response to a determination that the input password matches the puzzle password.

24 Claims, 6 Drawing Sheets

(51) Int. Cl.
*A63F 13/71* (2014.01)
*G06F 21/31* (2013.01)
*G06F 21/86* (2013.01)
*A63F 9/24* (2006.01)
*A63F 13/79* (2014.01)

(56) References Cited

U.S. PATENT DOCUMENTS

2004/0125399 A1\* 7/2004 Kobayashi ............ G06F 1/3203
  358/1.14
2007/0096870 A1\* 5/2007 Fisher ................. E05B 19/0005
  340/5.53

OTHER PUBLICATIONS

Sonic Games, The World Famous Isis and Ramisis Puzzles, http//:www.isisadventure.co.uk/start/platinum-pyramid.php (last visited Apr. 13, 2016).
Poisner et al., U.S. Appl. No. 14/697,343, filed Apr. 27, 2015.

\* cited by examiner

ELECTRONIC PUZZLES

BACKGROUND

Nearly every person has, at some point, entertained themselves or challenged themselves with the task of solving a puzzle. Indeed, puzzles have become a mainstay for entertaining people of all ages and, among others, include crossword puzzles, word-search puzzles, number-based puzzles (e.g., Sudoku puzzles), jigsaw puzzles, and logic puzzles (e.g., burr puzzles, puzzle boxes, etc.). A puzzle box is a three-dimensional box that is opened mechanically through a series of manipulations of particular features of the box. Depending on the complexity of the puzzle box, it may be opened by simply depressing a particular area of the box, or it may require a series of movements (e.g., a dozen moves, hundreds of moves, etc.) to be opened.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
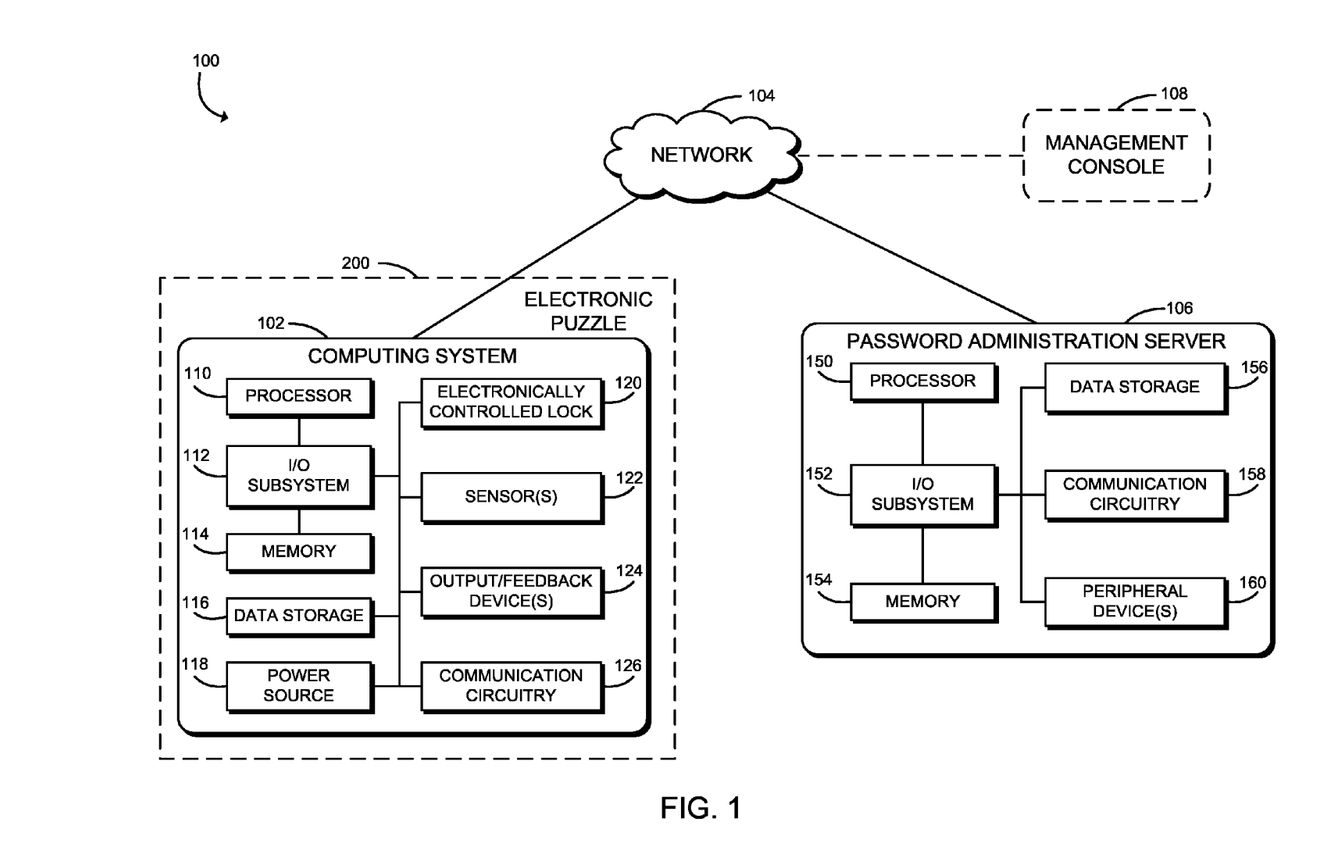
FIG. 1 is a simplified block diagram of at least one embodiment of a system for operating an electronic puzzle.
Figure 2A:
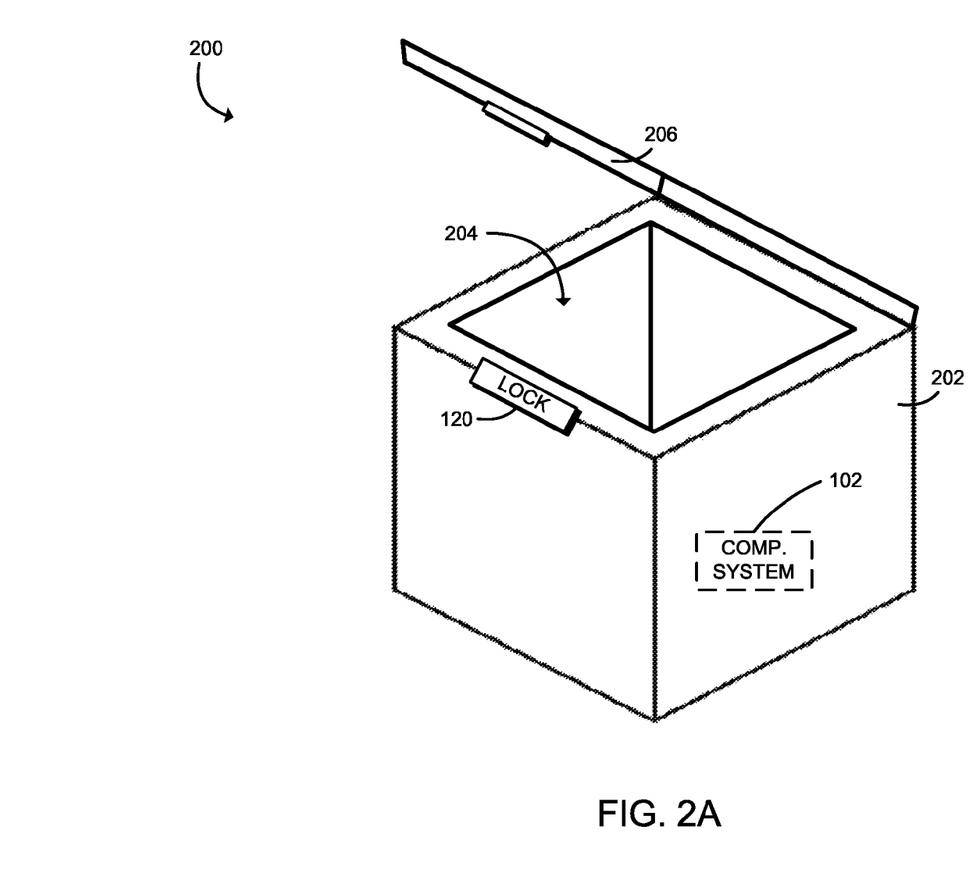
FIGS. 2A-2D are simplified diagrams of embodiments of an electronic puzzle of the system of FIG. 1.
Figure 2B:
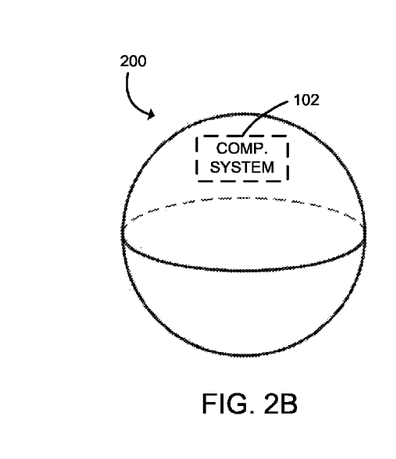
Figure 2C:
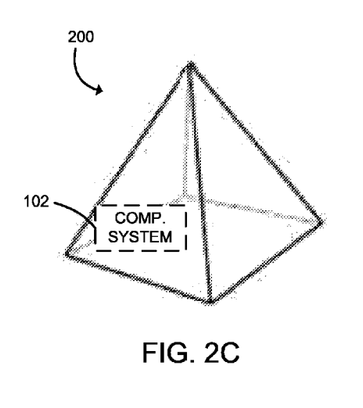
Figure 2D:
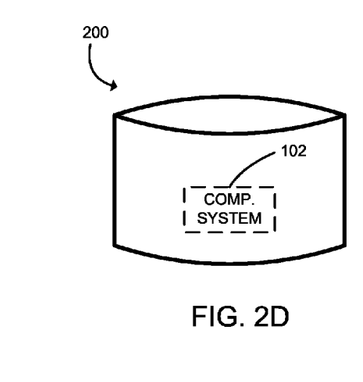

Referring now to FIG. 1, a system 100 for operating electronic puzzles includes a computing system 102, a network 104, and a password administration server 106. Additionally, in some embodiments, the system 100 may include a management console 108. Although only one computing system 102, one network 104, one password administration server 106, and one management console 108 are illustratively shown in FIG. 1, the system 100 may include any number of computing systems 102, networks 104, password administration servers 106, and/or management consoles 108 in other embodiments. For example, in some embodiments, a single password administration server 106 may be configured to manage the passwords for multiple electronic puzzles 200. As shown in FIG. 1, the computing system 102 is included in an electronic puzzle 200. For example, the computing system 102 may be integrally formed with, included within, or otherwise secured to a portion of the electronic puzzle 200. In the illustrative embodiment, as shown in FIG. 2A, the electronic puzzle 200 includes an outer housing 202 and at least one inner chamber 204 that is inaccessible when a corresponding chamber access door 206 or portal is locked and accessible when the chamber access door 206 is unlocked. Further, it should be appreciated that the outer housing 202 of the electronic puzzle 200 (i.e., the external appearance of the electronic puzzle 200) may be any three-dimensional shape suitable for the functions described herein. For example, the electronic puzzle 200 may be embodied as a rectangular prism (e.g., a cube), a sphere, a pyramid, or a cylinder as shown in FIGS. 2A-2D, respectively. In other embodiments, the electronic puzzle 200 may be embodied as, for example, a cone, a torus, a conic or pyramidal frustum, a triangular prism, a hexagonal prism or pyramid, a pentagonal prism or pyramid, a regular or irregular polyhedron, or a portion thereof.

As described in detail below, in the illustrative embodiment, the computing system 102 is configured to control an electronically controlled lock 120 of the electronic puzzle

200 to regulate access to an inner chamber of the electronic puzzle 200 and is further configured to monitor sensor data generated by sensors 122 of the computing system 102. Further, as described below, in some embodiments, the computing system 102 may be communicatively paired (e.g., via a short-range wireless network) with a remote computing device (e.g., a smartphone) and configured to use the sensors and/or other data of the remote computing device as sensor data. The computing system 102 generates an input password based on the monitored sensor data, compares the input password to a puzzle password stored in the computing system 102 (e.g., in a memory 114 or a data storage 116), and unlocks the electronically controlled lock to permit access to the inner chamber in response to determining that the input password matches the puzzle password. As described below, the password administration server 106 may be configured to establish/determine and/or reprogram a password of the electronic puzzle 200. In doing so, the password administration server 106 may determine the user inputs and/or non-user inputs (e.g., contextual data) required from a user's manipulation of the electronic puzzle 200 to access the inner chamber of the electronic puzzle 200, generate a puzzle password based on the user inputs, and transmit the puzzle password to the computing system 102 for initialization.

The computing system 102 may be embodied as any type of computing system or device capable of performing the functions described herein. For example, in some embodiments, the computing system 102 may be embodied as a microcontroller, embedded system, or other electronic control system. As shown in FIG. 1, the illustrative computing system 102 includes a processor 110, an input/output ("I/O") subsystem 112, a memory 114, a data storage 116, a power source 118, an electronically controlled lock 120, one or more sensors 122, one or more output/feedback devices 124, and a communication circuitry 126. Of course, the computing system 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 114, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing system 102 such as operating systems, applications, programs, libraries, and drivers. The memory 114 is communicatively coupled to the processor 110 via the I/O subsystem 112, which may be embodied as circuitry and/or components to facilitate input/output operations with the processor 110, the memory 114, and other components of the computing system 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing system 102, on a single integrated circuit chip.

The data storage 116 may be embodied as any type of device or devices configured for short-term or long-term storage of data such as, for example, memory devices and circuits, memory cards, hard disk drives, solid-state drives, or other data storage devices. The data storage 116 and/or the memory 114 may store various data during operation of the computing system 102 as described herein.

The power source 118 may be embodied as any component or device configured to store energy for use in powering the computing system 102 (e.g., a battery). In the illustrative embodiment, the power source 118 is embodied as a regenerative power source. For example, in some embodiments, the power source 118 may be recharged through a Universal Serial Bus (USB) port positioned on a housing of the electronic puzzle 200 or wirelessly through an inductive/magnetic coupling. In other embodiments, the power source 118 may include one or more photovoltaic power cells (i.e., solar cells) configured to convert solar energy to AC or DC power.

The electronically controlled lock 120 may be embodied as any lock configured to secure an inner chamber of the electronic puzzle 200 (e.g., securing a door of a housing of the electronic puzzle 200) in order to allow or restrict a user's access to the inner chamber. For example, in various embodiments, the electronically controlled lock 120 may be embodied as a solenoid, a shape-changing material, an electromagnet, and/or another suitable electronically controlled locking mechanism. As described below, in some embodiments, the electronic puzzle 200 may include multiple inner chambers. Accordingly, the electronic puzzle 200 may include any number of electronically controlled locks 120 depending on the particular embodiment.

The sensors 122 may be embodied as any sensors configured to generate data/signals indicative of an environment or context of the computing system 102 (e.g., in response to user interaction). In various embodiments, the sensors 122 may be embodied as, or otherwise include, for example, inertial sensors (e.g., accelerometers, magnetometers, gyroscopes, etc.), pressure/touch sensors, position sensors, location sensors, proximity sensors, optical sensors, light sensors, audio sensors (e.g., microphones), temperature sensors, motion sensors, piezoelectric sensors, cameras, communication sensors (e.g., to sense/identify data received from the password administration server 106), and/or other types of sensors. Of course, the computing system 102 may also include components and/or devices configured to facilitate the use of the sensor(s) 122. Depending on the particular embodiment, the sensors 122 may include hardware sensors and/or software sensors (e.g., software sensors to identify software applications executed at a particular point in time). Further, in some embodiments, the computing system 102 may be communicatively coupled to another computing device (e.g., a smartphone, router, etc.) and be configured to utilize various sensors of that computing device (e.g., GPS circuitry) for contextual inputs.

The output devices 124 may be embodied as any devices configured to generate feedback to a user of the system 100. For example, the output devices 124 may include one or more speakers, displays, vibration or other tactile feedback generators, lights, and/or other suitable output devices.

The communication circuitry 126 may be embodied as any communication circuit, device, or collection thereof, capable of enabling communications between the computing system 102 and other remote devices (e.g., the password administration server 106) over a network (e.g., the network 104). The communication circuitry 126 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The network 104 may be embodied as any type of communication network capable of facilitating communication between the computing system 102 and the password administration server 106 and other remote devices. As such, the network 104 may include one or more networks, routers, switches, computers, and/or other intervening devices. For example, each network 104 may be embodied as or otherwise include one or more cellular networks, telephone networks, local or wide area networks, publicly available global networks (e.g., the Internet), an ad hoc network, or any combination thereof.

The password administration server 106 may be embodied as any type of computing device capable of performing the functions described herein. For example, in some embodiments, the password administration server 106 may be embodied as a server, rack-mounted server, blade server, desktop computer, laptop computer, tablet computer, notebook, netbook, Ultrabook™, cellular phone, smartphone, personal digital assistant, mobile Internet device, wearable computing device, Hybrid device, and/or any other computing/communication device. As shown in FIG. 1, the illustrative password administration server 106 includes a processor 150, an I/O subsystem 152, a memory 154, a data storage 156, a communication circuitry 158, and one or more peripheral devices 160. Each of the processor 150, the I/O subsystem 152, the memory 154, the data storage 156, and the communication circuitry 158 may be similar to the corresponding components of the computing system 102. As such, the description of those components of the computing system 102 is equally applicable to the described of those components of the password administration server 106 and is not repeated herein for clarity of the description. The peripheral devices 160 may include any number of additional peripheral or interface devices, such as speakers, microphones, additional storage devices, and so forth. The particular devices included in the peripheral devices 160 may depend on, for example, the type and/or intended use of the password administration server 106. Further, it should be appreciated that the password administration server 106 may include other components, sub-components, and devices commonly found in a computing system, which are not discussed above for clarity of the description.

As shown, in some embodiments, the system 100 may include a management console 108, which may be used to interact with the password administration server 106 over the network 104 (or another network). In such embodiments, a puzzle creator or administrator may use the management console 108 to interact with the password administration server 106 to create, update, and/or otherwise modify the electronic puzzle 200 (e.g., the puzzle password) as described herein. It should be appreciated that the management console 108 may be embodied as any type of computing device capable of performing the functions described herein (e.g., a desktop computer, laptop computer, tablet computer, notebook, netbook, Ultrabook™, cellular phone, smartphone, personal digital assistant, mobile Internet device, wearable computing device, Hybrid device, server, and/or any other computing/communication device).

Figure 3:
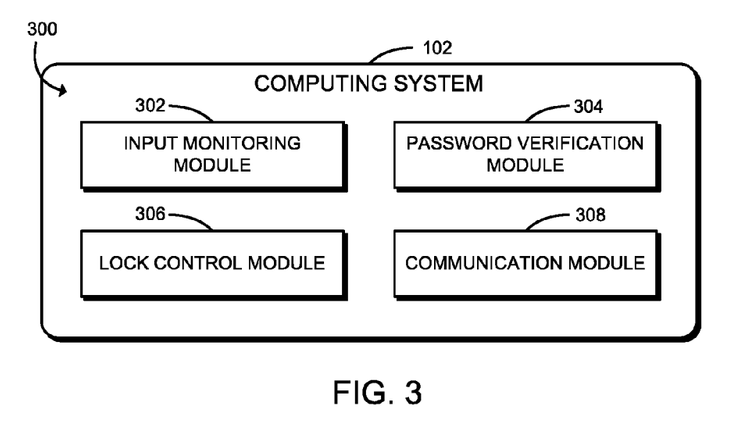
FIG. 3 is a simplified block diagram of at least one embodiment of an environment of a computing system of the system of FIG. 1.

Referring now to FIG. 3, in use, the computing system 102 establishes an environment 300 for operating an electronic puzzle 200. The illustrative environment 300 includes an input monitoring module 302, a password verification module 304, a lock control module 306, and a communication module 308. The various modules of the environment 300 may be embodied as hardware, software, firmware, or a combination thereof. For example, the various modules, logic, and other components of the environment 300 may form a portion of, or otherwise be established by, the processor 110 or other hardware components of the computing system 102. As such, in some embodiments, one or more of the modules of the environment 300 may be embodied as circuitry or collection of electrical devices (e.g., an input monitoring circuitry 302, a password verification circuitry 304, a lock control circuitry 306, and a communication circuitry 308). It should be appreciated that, in such embodiments, one or more of the input monitoring circuitry 302, the password verification circuitry 304, the lock control circuitry 306, and/or the communication circuitry 308 may form a portion of one or more of the processor 110, the I/O subsystem 112, the memory 114, the data storage 116, the power source 118, the electronically controlled lock 120, the sensors 122, the output devices 124, and/or the communication circuitry 126. Additionally, in some embodiments, one or more of the illustrative modules may form a portion of another module and/or one or more of the illustrative modules may be independent of one another.

The input monitoring module 302 monitors sensor data generated by the sensors 122 of the computing system 102. As described herein, the sensors 122 may be configured to sense a number of physical manipulations of the electronic puzzle 200 and generate sensor data accordingly. For example, sensors 122 internal to and/or externally mounted on the electronic puzzle 200 may be configured to sense the user's finger/hand is located at a particular position on the electronic puzzle 200, the absolute orientation of the electronic puzzle 200 relative to Earth's magnetic field (e.g., a compass), the velocity/acceleration of the electronic puzzle 200 in a particular direction, the user has covered an aperture defined in the electronic puzzle 200, rotation of the electronic puzzle 200 or a portion thereof, the physical location of the electronic puzzle 200 (e.g., via GPS), whether the electronic puzzle 200 is communicatively coupled to or within the vicinity of another electronic puzzle, audio, and/or other features of the electronic puzzle 200 or its physical environment. As such, it should be appreciated that the input monitoring module 302 may monitor user inputs and non-user inputs (e.g., contextual inputs) to the electronic puzzle 200. For example, the input monitoring module 302 may monitor a sequence and/or combination of generated sensor data that results from a user's manipulation of the electronic puzzle 200.

The password verification module 304 is configured to generate an input password based on the monitored sensor data and compare the input password to an established puzzle password stored in the memory 114 or the data storage 116 of the computing system 102 to determine whether the input password (i.e. generated based on user and/or non-user inputs) matches the stored puzzle password. As described below, the puzzle password may be pre-established on the electronic puzzle 200. Further, in some embodiments, the puzzle password may be received from the password administration server 106 and/or the computing system 102 may be reprogrammed with different puzzle passwords. Of course, the input password and the puzzle password may be generated and represented in any suitable way depending on the particular embodiment. For example, in some embodiments, the relevant sensor data may be hashed or otherwise combined to generate the input password.

The lock control module 306 controls the electronically controlled lock 120 to regulate access to the inner chamber of the electronic puzzle 200. As described above, in some embodiments, the electronic puzzle 200 may include multiple inner chambers and corresponding electronically controlled locks 120. In such embodiments, the lock control module 306 may be configured to control each of the electronically controlled locks 120 independently of one another. Of course, in some embodiments, one of the locks 120 may not be capable of being unlocked without first opening another lock 120 (e.g., an electronic puzzle 200 with nested inner chambers).

The communication module 308 handles the communication between the computing system 102 and other computing devices of the system 100 (e.g., the password administration server 106). For example, as described herein, the computing system 102 may be configured to receive the puzzle password from the password administration server 106. Further, in some embodiments, the communication module 308 may transmit a notification message to the password administration server 106 in response to determining that the electronically controlled lock 120 has been unlocked (e.g., to inform the password administration server 106 of successful completion of the puzzle) and/or to report an intermediate state of the electronic puzzle 200 (e.g., to monitor the user's progress in solving the puzzle). That is, in some embodiments, the computing system 102 may periodically update the password administration server 106 of the current state of the electronic puzzle 200 and/or the user's progress in solving the puzzle 200 (e.g., including past user inputs). Additionally, in some embodiments, the computing system 102 may be communicatively coupled with a computing system of another electronic puzzle (e.g., nearby or remote) such that multiple electronic puzzles 200 may be used collaboratively to solve a puzzle (e.g., with a password requiring user manipulation of multiple electronic puzzles).

Figure 4:
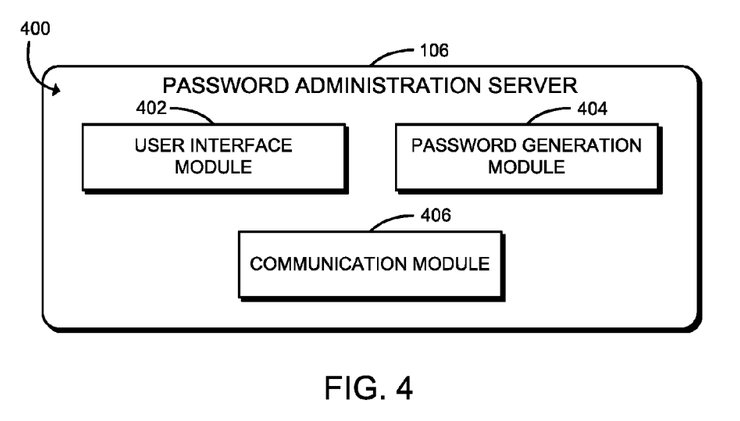
FIG. 4 is a simplified block diagram of at least one embodiment of an environment of a password administration server of the system of FIG. 1.

Referring now to FIG. 4, in use, the password administration server 106 establishes an environment 400 for determining/establishing a password for the electronic puzzle 220. The illustrative environment 400 includes a user interface module 402, a password generation module 404, and a communication module 406. The various modules of the environment 400 may be embodied as hardware, software, firmware, or a combination thereof. For example, the various modules, logic, and other components of the environment 400 may form a portion of, or otherwise be established by, the processor 150 or other hardware components of the password administration server 106. As such, in some embodiments, one or more of the modules of the environment 400 may be embodied as circuitry or collection of electrical devices (e.g., a user interface circuitry 402, a password generation circuitry 404, and a communication circuitry 406). It should be appreciated that, in such embodiments, one or more of the user interface circuitry 402, the password generation circuitry 404, and/or the communication circuitry 406 may form a portion of one or more of the processor 150, the I/O subsystem 152, the memory 154, the data storage 156, the communication circuitry 158, and/or the peripheral devices 160. Additionally, in some embodiments, one or more of the illustrative modules may form a portion of another module and/or one or more of the illustrative modules may be independent of one another.

The user interface module 402 is configured to permit a user of the password administration server 106 to interact with and/or provide feedback to the password administration server 106. For example, the user interface module 402 may determine one or more user inputs and/or non-user inputs (e.g., a time period, geographical location, etc.) required from a user's manipulation of the electronic puzzle 200 to unlock the electronically controlled lock 120 and access the inner chamber of the electronic puzzle 200. That is, the user may select one or more user inputs and/or non-user inputs (e.g., contextual information) to constitute the puzzle password (e.g., via a graphical user interface). In doing so, the user may select a sequence (e.g., a temporally ordered set) and/or combination of user manipulations/inputs of the electronic puzzle 200 (e.g., depress a first portion of the electronic puzzle 200, rotate the electronic puzzle 200, and then simultaneously depress a second and third portion of the electronic puzzle 200). Of course, in embodiments in which the electronic puzzle 200 includes multiple electronically controlled locks 120, the user interface module 402 may determine the password required to unlock each of those locks 120 (e.g., based on user inputs).

The password generation module 404 is configured to generate a puzzle password based on the user inputs and/or non-user inputs (e.g., selected by the user of the password administration server 106). As indicated above, the puzzle password may be generated and represented in any suitable way depending on the particular embodiment. For example, in some embodiments, the user inputs and/or non-user inputs selected by the user may be hashed or otherwise combined to generate the puzzle password, which may be compared to an input password generated by the computing system 102 based on user manipulations of the electronic puzzle 200 and/or corresponding non-user (e.g., contextual) inputs. Further, the password generation module 404 may store the puzzle password in the memory 154 or the data storage 156 of the password generation module 404.

The communication module 406 handles the communication between the password administration server 106 and other computing devices of the system 100 (e.g., the computing system 102 of the electronic puzzle 200). For example, in some embodiments, the communication module 406 may transmit the selected puzzle password(s) to the computing system 102. Further, as indicated above, the password administration server 106 may receive a notification from the computing system 102 indicating that the corresponding electronic puzzle 200 has been solved.

Figure 5:
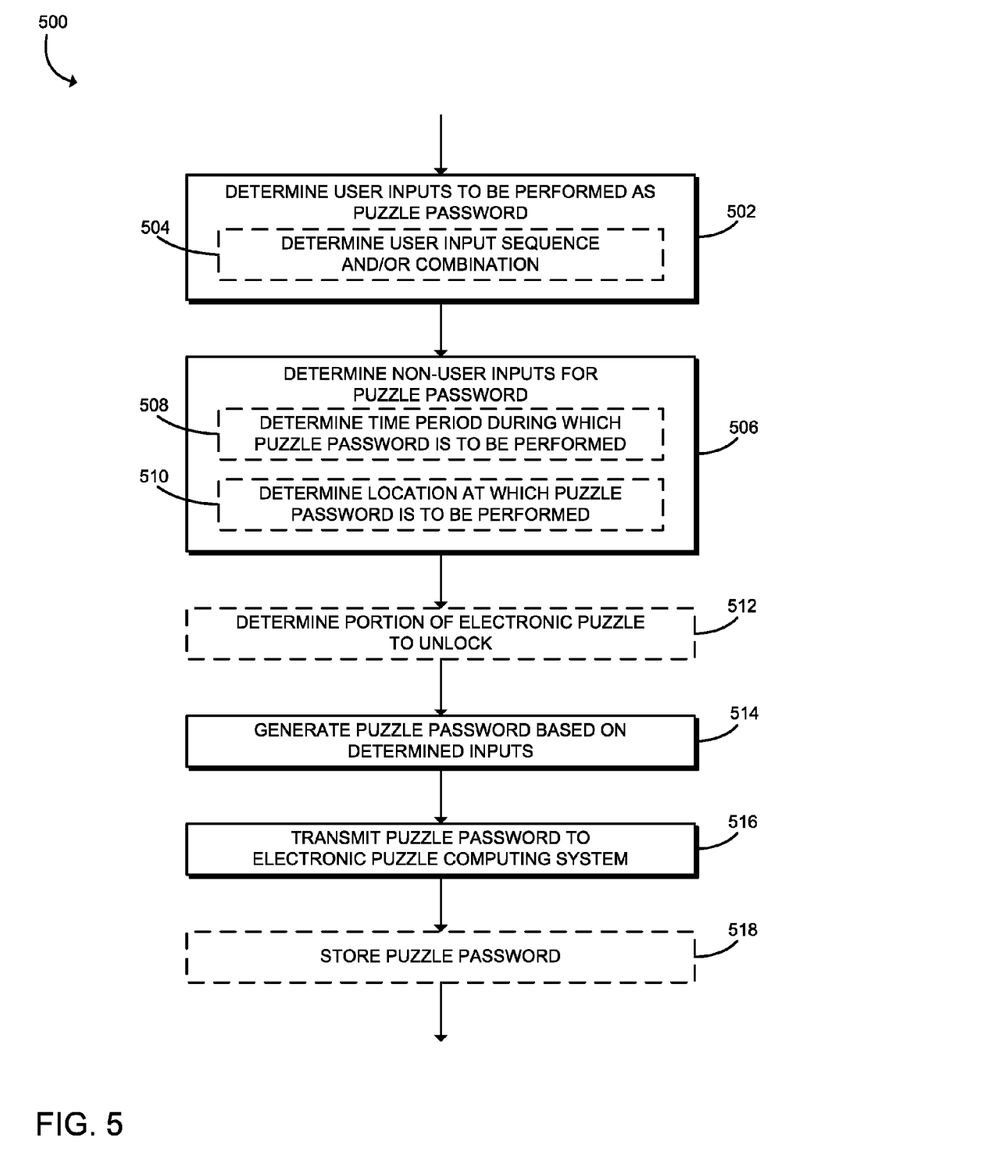
FIG. 5 is a simplified block diagram of at least one embodiment of a method for determining a password for the electronic puzzle of FIG. 1.

Referring now to FIG. 5, in use, the password administration server 106 may execute a method 500 for determining a password for an electronic puzzle 200. The illustrative method 500 begins with block 502 in which the password administration server 106 determines the user inputs to be performed as the puzzle password. In doing so, in block 504, the password administration server 106 may determine one or more user input sequences and/or combinations of user inputs. For example, as indicated above, the user may select a particular sequence/combination of user manipulations of the electronic puzzle 200 required in order to unlock an electronically controlled lock 120 of the electronic puzzle 200 to permit access to an inner chamber of the electronic puzzle 200. For example, a particular puzzle password could require the user to touch a particular part of the electronic puzzle 200 and then simultaneously cover an aperture defined in the electronic puzzle 200 and point a portion of the electronic puzzle 200 due north. In another embodiment, the puzzle password may require the user to enter/type a word or phrase on the electronic puzzle 200 itself or through a paired external device (e.g., a smartphone). In some embodiments, a puzzle creator may, for example, place the electronic puzzle 200 in a "learning mode" and perform various physical manipulations of the electronic puzzle 200, which may be recorded and serve as the puzzle password. Further, subsequent to recording, the puzzle creator may select which of the recorded physical manipulations are to serve as the password, which may allow unintended, low-level, and/or extraneous manipulations to be ignored in establishing the puzzle password.

In block 506, the password administration server 106 determines the non-user inputs, if any, that are to be incorporated as part of the puzzle password. That is, in order to unlock the electronically controlled lock 120, the puzzle password may require a specific context of the electronic puzzle 200 and/or other non-user inputs to occur. For example, in block 508, the password administration server 106 may determine a time period during which the puzzle password must be performed (e.g., an absolute time period such as a particular day, a recurring time period such as within a given hour of the day, etc.). Further, in block 510, the password administration server 106 may determine the location at which the puzzle password is to be performed (e.g., a particular store or other geographical location) in order to unlock the electronically controlled lock 120. In some embodiments, it should be appreciated that the electronic controlled lock 120 may not be unlocked without the occurrence of the non-user inputs even if the user correctly inputs the password insofar as the user inputs are concerned.

As indicated above, in some embodiments, the electronic puzzle 200 may include multiple electronically controlled locks 120 and corresponding inner chambers or otherwise inaccessible portions of the electronic puzzle 200. Accordingly, in block 512, the password administration server 106 may determine the portion (i.e., the particular electronically controlled lock(s) 120) of the electronic puzzle 200 the particular determined puzzle password is to unlock. As such, it should be appreciated that the password administration server 106 may determine a puzzle password (e.g., a separate password) for each of the electronically controlled locks 120 of the electronic puzzle 200. Further, in some embodiments, one or more of the electronically controlled locks 120 may be unable to be unlocked (and the corresponding inner chamber therefore inaccessible) without first unlocking another electronically controlled lock 120.

In block 514, the password administration server 106 generates a puzzle password for the electronic puzzle 200 based on the determined user inputs and/or non-user inputs (e.g., selected by the password administrator). As indicated above, the puzzle password may be generated and represented in any way suitable for comparison to an input password generated by the computing system 102 of the electronic puzzle 200 (e.g., by hashing the required inputs). In block 516, the password administration server 106 transmits the puzzle password to the computing system 102 of the electronic puzzle 200. In block 518, the password administration server 106 may store the puzzle password in the memory 154 and/or the data storage 156.

It should be appreciated that, in some embodiments, the electronic puzzle 200 may be preconfigured with a puzzle password. Further, in some embodiments, the puzzle password of the electronic puzzle 200 may be reconfigured/reprogrammed based on a new puzzle password received from the password administration server 106. In such a way, the same physical electronic puzzle 200 may permit a user to solve and/or attempt to solve a wide variety of puzzles without purchasing a different physical device. Of course, in some embodiments, a puzzle generating institution may charge a fee for access to the new puzzles. Further, in some embodiments, a puzzle generating institution may provide a prize or award for solving a particular puzzle it has created.

It should be appreciated that, in some embodiments, the method 500 may be embodied as various instructions stored on a computer-readable media, which may be executed by the processor 150 and/or other components of the password administration server 106 to cause the password administration server 106 to perform the method 500. The computer-readable media may be embodied as any type of media capable of being read by the password administration server 106 including, but not limited to, the memory 154, the data storage 156, a local memory of the communication circuitry 158, other memory or data storage devices of the password administration server 106, portable media readable by a peripheral device 160 of the password administration server 106, and/or other media.

Figure 6:
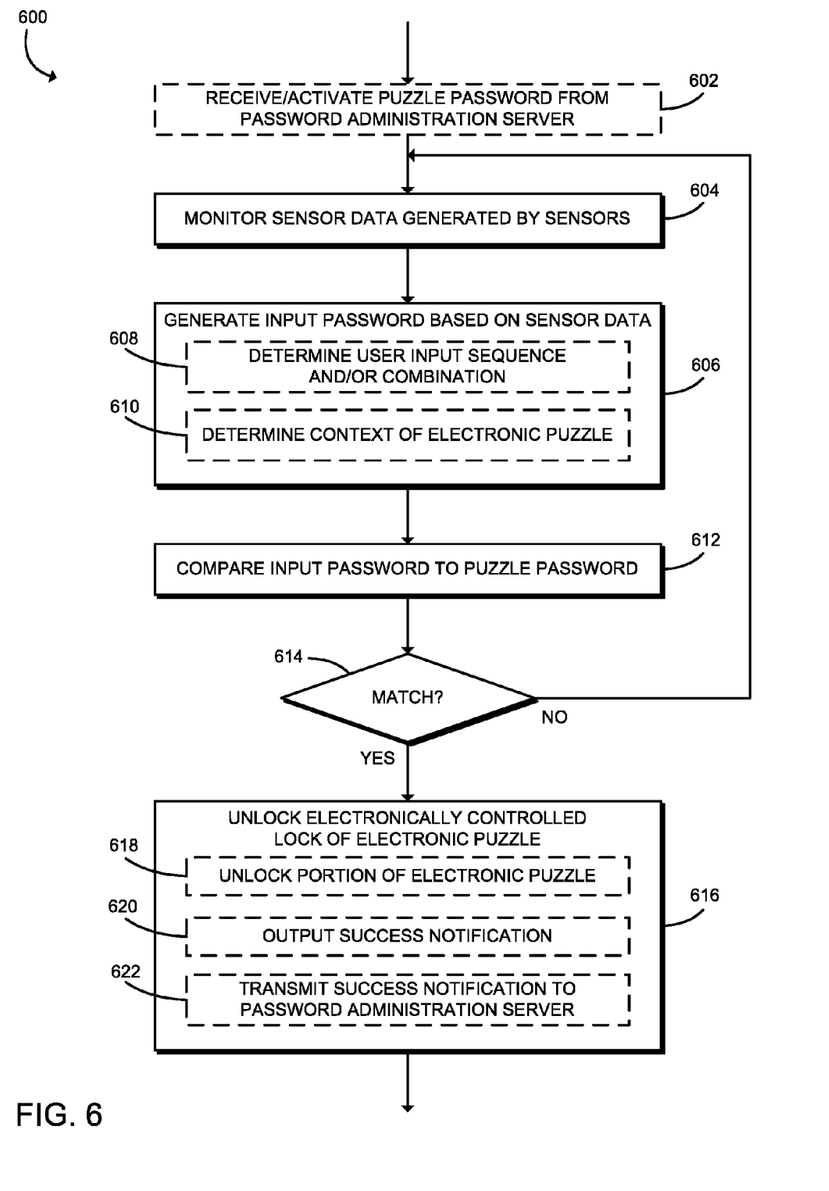
FIG. 6 is a simplified block diagram of at least one embodiment of a method for operating the electronic puzzle of FIG. 1.

Referring now to FIG. 6, in use, the computing system 102 may execute a method 600 for operating an electronic puzzle 200. The illustrative method 600 begins with block 602 in which the computing system 102 may receive a puzzle password from the password administration server 106 and/or activate a particular puzzle password for use by the electronic puzzle 200. Of course, in some embodiments, a particular puzzle password may be preloaded and/or pre-activated by the electronic puzzle 200 as indicated above.

In block 604, the computing system 102 monitors the sensor data generated by the sensors 122 of the electronic puzzle 200. As indicated above, the sensors 122 generate sensor data indicative of the various physical manipulations of the electronic puzzle 200 by the user and may vary depending on the particular embodiment. Further, in some embodiments, the sensors 122 may be configured to generate sensor data indicative of a context of the electronic puzzle 200 (e.g., a physical location, computing devices to which the computing system 102 is paired, a current time, etc.). Further, as described herein, in some embodiments, the computing system 102 may be communicatively coupled to another computing device (e.g., a smartphone, router, etc.) and be configured to utilize various sensors of that computing device (e.g., GPS circuitry) for contextual and/or user inputs.

In block 606, the computing system 102 generates an input password based on the monitored sensor data. In doing so, in block 608, the computing system 102 may determine one or more sequences and/or combinations of user manipulations of the electronic puzzle 200 (i.e., user input sequences/combinations). Further, in block 610, the computing system 102 may determine the context of the electronic puzzle 200. As discussed above, the computing system 102 may generate and represent the input password in any way suitable for comparison to the puzzle password of the electronic puzzle 200 (e.g., by hashing the required inputs).

In block 612, the computing system 102 compares the input password to the puzzle password to determine if there is a match. As indicated above, in some embodiments, a particular electronic puzzle 200 may include multiple electronically controlled locks 120 and each of the locks 120 may be associated with a different password. Accordingly, in such embodiments, the computing system 102 may compare the input password to each of the puzzle passwords (i.e., for each of the locks 120) to determine whether the input password matches any of those puzzle passwords. If no match is detected, the method 600 returns to block 604 in which the computing system 102 continues to monitor the sensor data generated by the sensors 122. In other words, in the illustrative embodiment, the computing system 102 continuously monitors the sensor data and generates corresponding input passwords for comparison to the puzzle password(s) of the electronic puzzle 200. In some embodiments, the computing system 102 may track and store incorrect solutions to the electronic puzzle 200 (e.g., for subsequent analysis by the password administration server 106 or other remote computing device). For example, the password administration server 106 may analyze the incorrect solutions, determine the puzzle password is more difficult than intended, and modify the puzzle password. Further, in some embodiments, the electronic puzzle 200 may only permit a certain number of incorrect solutions.

If, in block 614, the computing system 102 determines that the input password matches a puzzle password, the computing system 102 unlocks the corresponding electronically controlled lock 120 in block 616. In doing so, in block 618, the computing system 102 may unlock a portion of the electronic puzzle 200 previously inaccessible to the user of the electronic puzzle 200. However, it should be appreciated that, in embodiments in which multiple locks 120 are included, other portions of the electronic puzzle 200 may remain inaccessible. In block 620, the computing system 102 may output a success notification to the user indicating that the user has successfully solved the puzzle. For example, in some embodiments, the computing system 102 may display a unique identifier on a display positioned within an inner chamber unlocked via the electronically controlled lock 120 (e.g., to redeem for a prize with the puzzle creator). In other embodiments, the computing system 102 may flash one or more lights and/or play audio on one or more speakers of the computing system 102 to indicate the puzzle has been successfully completed. Further, in block 622, the computing system 102 may transmit a success notification message to the password administration server 106.

It should be appreciated that, in some embodiments, the method 600 may be embodied as various instructions stored on a computer-readable media, which may be executed by the processor 100 and/or other components of the computing system 102 to cause the computing system 102 to perform the method 600. The computer-readable media may be embodied as any type of media capable of being read by the computing system 102 including, but not limited to, the memory 114, the data storage 116, a local memory of the communication circuitry 126, other memory or data storage devices of the computing system 102, portable media readable by a peripheral device of the computing system 102, and/or other media.

It should be further appreciated that the techniques described herein open a wide array of possibilities for creating and solving electronic puzzles. For example, in some embodiments, a particular electronic puzzle 200 (e.g., a puzzle box) may be purchased with a set of default puzzles and the user may subsequently download additional puzzles. The puzzles may be created, for example, by someone known to the user (e.g., a friend, parent, or teacher); a professional service that creates puzzles as adjuncts to a movie, book, or television show (e.g., a puzzle that involves clues from a children's movie); a professional service that provides puzzles for a fee; and/or a corporate entity that is running a contest (e.g., the first hundred players to solve the puzzle are awarded $100). Further, in some embodiments, a sequence of puzzles may each be part of a larger story (e.g., to follow along with a movie).

EXAMPLES

Illustrative examples of the technologies disclosed herein are provided below. An embodiment of the technologies may include any one or more, and any combination of, the examples described below.

Example 1 includes a computing system of an electronic puzzle, the computing system comprising a memory; an electronically controlled lock; a plurality of sensors to generate sensor data; a lock control circuitry to control the electronically controlled lock to regulate access to an inner chamber of the electronic puzzle; an input monitoring circuitry to monitor the sensor data generated by the plurality of sensors; and a password verification circuitry to (i) generate an input password based on the monitored sensor data and (ii) compare the input password to a puzzle password stored in the memory; wherein the lock control circuitry is further to unlock the electronically controlled lock to permit access to the inner chamber in response to a determination that the input password matches the puzzle password.

Example 2 includes the subject matter of Example 1, and wherein the electronically controlled lock comprises at least one of a solenoid, a shape-changing material, or an electromagnet.

Example 3 includes the subject matter of any of Examples 1 and 2, and further including a communication circuitry to receive the puzzle password from a password administration server, wherein to monitor the sensor data comprises to monitor the sensor data in response to receipt of the puzzle password.

Example 4 includes the subject matter of any of Examples 1-3, and wherein the communication circuitry is further to report a current status of the electronic puzzle to the password administration server.

Example 5 includes the subject matter of any of Examples 1-4, and further including a communication circuitry to receive at least one of sensor data or user input data from a computing device communicatively coupled to the computing system and in a vicinity of the electronic puzzle; wherein to generate the input password comprises to generate the input password based on the at least one of the sensor data or the user input data.

Example 6 includes the subject matter of any of Examples 1-5, and wherein to monitor the sensor data comprises to monitor a sequence of generated sensor data that results from a user's manipulation of the electronic puzzle.

Example 7 includes the subject matter of any of Examples 1-6, and wherein to monitor the sensor data comprises to monitor a combination of generated sensor data that results from a user's manipulation of the electronic puzzle.

Example 8 includes the subject matter of any of Examples 1-7, and wherein the plurality of sensors comprises at least one of an inertial sensor, a microphone, a pressure sensor, or a light sensor.

Example 9 includes the subject matter of any of Examples 1-8, and wherein the plurality of sensors comprises at least one of an accelerometer, a gyroscope, or a magnetometer.

Example 10 includes the subject matter of any of Examples 1-9, and wherein to monitor the sensor data comprises to determine whether the electronic puzzle is located near another electronic puzzle; and wherein to generate the input password comprises to generate the input password based on the determination of whether the electronic puzzle is located near the another electronic puzzle.

Example 11 includes the subject matter of any of Examples 1-10, and wherein to monitor the sensor data comprises to determine a context of the electronic puzzle.

Example 12 includes the subject matter of any of Examples 1-11, and wherein to determine the context of the electronic puzzle comprises to determine a geographic location of the electronic puzzle.

Example 13 includes the subject matter of any of Examples 1-12, and wherein the electronically controlled lock comprises a first electronically controlled lock to regulate access to a first inner chamber of the electronic puzzle; and further comprising a second electronically controlled lock to regulate access to a second inner chamber of the electronic puzzle.

Example 14 includes the subject matter of any of Examples 1-13, and wherein the second inner chamber is inaccessible without access to the first inner chamber.

Example 15 includes the subject matter of any of Examples 1-14, and further including a display positioned within the inner chamber to display a unique identifier in response to a determination that the electronically controlled lock has been unlocked.

Example 16 includes the subject matter of any of Examples 1-15, and further including a communication circuitry to transmit a notification message to a password administration server in response to a determination that the electronically controlled lock has been unlocked.

Example 17 includes the subject matter of any of Examples 1-16, and further including a rechargeable power source.

Example 18 includes a method of operating an electronic puzzle, the method comprising monitoring, by a computing system of the electronic puzzle, sensor data generated by a plurality of sensors of the computing system; generating, by the computing system, an input password based on the monitored sensor data; comparing, by the computing system, the input password to a puzzle password stored in a memory of the computing system; and unlocking, by the computing system, an electronically controlled lock of the electronic puzzle to permit access to an inner chamber of the electronic puzzle in response to a determination that the input password matches the puzzle password.

Example 19 includes the subject matter of Example 18, and further including receiving, by the computing system, the puzzle password from a password administration server; and wherein monitoring the sensor data comprises monitoring the sensor data in response receiving of the puzzle password.

Example 20 includes the subject matter of any of Examples 18 and 19, and further including reporting, by the computing system, a current status of the electronic puzzle to the password administration server.

Example 21 includes the subject matter of any of Examples 18-20, and further including receiving, by the computing system, at least one of sensor data or user input data from a computing device communicatively coupled to the computing system and in a vicinity of the electronic puzzle; wherein generating the input password comprises generating the input password based on the at least one of the sensor data or the user input data.

Example 22 includes the subject matter of any of Examples 18-21, and wherein monitoring the sensor data comprises monitoring a sequence of generated sensor data that results from a user's manipulation of the electronic puzzle.

Example 23 includes the subject matter of any of Examples 18-22, and wherein monitoring the sensor data comprises monitoring a combination of generated sensor data that results from a user's manipulation of the electronic puzzle.

Example 24 includes the subject matter of any of Examples 18-23, and wherein monitoring the sensor data comprises determining whether the electronic puzzle is located near another electronic puzzle; and wherein generating the input password comprises generating the input password based on the determination of whether the electronic puzzle is located near the another electronic puzzle.

Example 25 includes the subject matter of any of Examples 18-24, and wherein monitoring the sensor data comprises determining a context of the electronic puzzle.

Example 26 includes the subject matter of any of Examples 18-25, and wherein determining the context of the electronic puzzle comprises determining a geographic location of the electronic puzzle.

Example 27 includes the subject matter of any of Examples 18-26, and wherein unlocking the electronically controlled lock comprises unlocking a first electronically controlled lock to permit access to a first inner chamber of the electronic puzzle; and further comprising unlocking, by the computing system, a second electronically controlled lock of the electronic puzzle to permit access to a second inner chamber of the electronic puzzle.

Example 28 includes the subject matter of any of Examples 18-27, and wherein the second inner chamber is inaccessible without access to the first inner chamber.

Example 29 includes the subject matter of any of Examples 18-28, and further including displaying, by a display positioned within the inner chamber, a unique identifier in response to determining that the electronically controlled lock has been unlocked.

Example 30 includes the subject matter of any of Examples 18-29, and further including transmitting, by the computing system, a notification message to a password administration server in response to determining that the electronically controlled lock has been unlocked.

Example 31 includes the subject matter of any of Examples 18-30, and wherein the electronically controlled lock comprises at least one of a solenoid, a shape-changing material, or an electromagnet.

Example 32 includes the subject matter of any of Examples 18-31, and wherein the plurality of sensors comprises at least one of an inertial sensor, a microphone, a pressure sensor, or a light sensor.

Example 33 includes the subject matter of any of Examples 18-32, and wherein the plurality of sensors comprises at least one of an accelerometer, a gyroscope, or a magnetometer.

Example 34 includes a computing device comprising a processor; and a memory having stored therein a plurality of instructions that when executed by the processor cause the computing device to perform the method of any of Examples 18-33.

Example 35 includes one or more machine-readable storage media comprising a plurality of instructions stored thereon that in response to being executed result in a computing device performing the method of any of Examples 18-33.

Example 36 includes a computing device comprising means for performing the method of any of Examples 18-33.

Example 37 includes a computing system of an electronic puzzle, the computing system comprising means for monitoring sensor data generated by a plurality of sensors of the computing system; means for generating an input password based on the monitored sensor data; means for comparing the input password to a puzzle password stored in a memory of the computing system; and means for unlocking an electronically controlled lock of the electronic puzzle to permit access to an inner chamber of the electronic puzzle in response to a determination that the input password matches the puzzle password.

Example 38 includes the subject matter of Example 37, and further including means for receiving the puzzle password from a password administration server; and wherein the means for monitoring the sensor data comprises means for monitoring the sensor data in response receiving of the puzzle password.

Example 39 includes the subject matter of any of Examples 37 and 38, and further including means for reporting a current status of the electronic puzzle to the password administration server.

Example 40 includes the subject matter of any of Examples 37-39, and further including means for receiving at least one of sensor data or user input data from a computing device communicatively coupled to the computing system and in a vicinity of the electronic puzzle; wherein the means for generating the input password comprises means for generating the input password based on the at least one of the sensor data or the user input data.

Example 41 includes the subject matter of any of Examples 37-40, and wherein the means for monitoring the sensor data comprises means for monitoring a sequence of generated sensor data that results from a user's manipulation of the electronic puzzle.

Example 42 includes the subject matter of any of Examples 37-41, and wherein the means for monitoring the sensor data comprises means for monitoring a combination of generated sensor data that results from a user's manipulation of the electronic puzzle.

Example 43 includes the subject matter of any of Examples 37-42, and wherein the means for monitoring the sensor data comprises means for determining whether the electronic puzzle is located near another electronic puzzle; and wherein the means for generating the input password comprises means for generating the input password based on the determination of whether the electronic puzzle is located near the another electronic puzzle.

Example 44 includes the subject matter of any of Examples 37-43, and wherein the means for monitoring the sensor data comprises means for determining a context of the electronic puzzle.

Example 45 includes the subject matter of any of Examples 37-44, and wherein the means for determining the context of the electronic puzzle comprises means for determining a geographic location of the electronic puzzle.

Example 46 includes the subject matter of any of Examples 37-45, and wherein the means for unlocking the electronically controlled lock comprises means for unlocking a first electronically controlled lock to permit access to a first inner chamber of the electronic puzzle; and further comprising means for unlocking a second electronically controlled lock of the electronic puzzle to permit access to a second inner chamber of the electronic puzzle.

Example 47 includes the subject matter of any of Examples 37-46, and wherein the second inner chamber is inaccessible without access to the first inner chamber.

Example 48 includes the subject matter of any of Examples 37-47, and further including means for displaying, by a display positioned within the inner chamber, a unique identifier in response to determining that the electronically controlled lock has been unlocked.

Example 49 includes the subject matter of any of Examples 37-48, and further including means for transmitting a notification message to a password administration server in response to determining that the electronically controlled lock has been unlocked.

Example 50 includes the subject matter of any of Examples 37-49, and wherein the electronically controlled lock comprises at least one of a solenoid, a shape-changing material, or an electromagnet.

Example 51 includes the subject matter of any of Examples 37-50, and wherein the plurality of sensors comprises at least one of an inertial sensor, a microphone, a pressure sensor, or a light sensor.

Example 52 includes the subject matter of any of Examples 37-51, and wherein the plurality of sensors comprises at least one of an accelerometer, a gyroscope, or a magnetometer.

Example 53 includes a password administration server of determining a password for an electronic puzzle, the password administration server comprising a user interface circuitry to determine one or more user inputs required from a user's manipulation of the electronic puzzle to access an inner chamber of the electronic puzzle; a password generation circuitry to generate a puzzle password based on the one or more user inputs; and a communication circuitry to transmit the puzzle password to a computing system of the electronic puzzle.

Example 54 includes the subject matter of Example 53, and wherein the user interface circuitry is further to determine one or more non-user inputs required to access the inner chamber; and wherein the password generation circuitry is to generate the puzzle password based on the one or more user inputs and the one or more non-user inputs.

Example 55 includes the subject matter of any of Examples 53 and 54, and wherein to determine the one or more non-user inputs comprises to determine a time period during which the puzzle password is to be performed.

Example 56 includes the subject matter of any of Examples 53-55, and wherein to determine the one or more non-user inputs comprises to determine a geographical location at which the puzzle password is to be performed.

Example 57 includes the subject matter of any of Examples 53-56, and wherein to determine the one or more user inputs comprises to receive a selection of the one or more user inputs from a user of the password administration server.

Example 58 includes the subject matter of any of Examples 53-57, and wherein to determine the one or more user inputs comprises to determine a sequence of user manipulations of the electronic puzzle required to access the inner chamber.

Example 59 includes the subject matter of any of Examples 53-58, and wherein to determine the one or more user inputs comprises to determine a combination of user manipulations of the electronic puzzle required to access the inner chamber.

Example 60 includes the subject matter of any of Examples 53-59, and wherein the password generation circuitry is further to store the puzzle password in a memory of the password administration server.

Example 61 includes the subject matter of any of Examples 53-60, and wherein the inner chamber is a first inner chamber; and wherein the user interface circuitry is further to determine another one or more user inputs required from the user's manipulation of the electronic puzzle to access a second inner chamber of the electronic puzzle.

Example 62 includes the subject matter of any of Examples 53-61, and wherein the second inner chamber is inaccessible without access to the first inner chamber.

Example 63 includes the subject matter of any of Examples 53-62, and wherein to determine the one or more user inputs required from a user's manipulation of the electronic puzzle to access an inner chamber of the electronic puzzle comprises to receive data indicative of a puzzle creator's prior manipulation of the electronic puzzle.

Example 64 includes a method of determining a password for an electronic puzzle, the method comprising determining, by a password administration server, one or more user inputs required from a user's manipulation of the electronic puzzle to access an inner chamber of the electronic puzzle; generating, by the password administration server, a puzzle password based on the one or more user inputs; and transmitting, by the password administration server, the puzzle password to a computing system of the electronic puzzle.

Example 65 includes the subject matter of Example 64, and further including determining one or more non-user inputs required to access the inner chamber; and wherein generating the puzzle password comprises generating the puzzle password based on the one or more user inputs and the one or more non-user inputs.

Example 66 includes the subject matter of any of Examples 64 and 65, and wherein determining the one or more non-user inputs comprises determining a time period during which the puzzle password is to be performed.

Example 67 includes the subject matter of any of Examples 64-66, and wherein determining the one or more non-user inputs comprises determining a geographical location at which the puzzle password is to be performed.

Example 68 includes the subject matter of any of Examples 64-67, and wherein determining the one or more user inputs comprises receiving a selection of the one or more user inputs from a user of the password administration server.

Example 69 includes the subject matter of any of Examples 64-68, and wherein determining the one or more user inputs comprises determining a sequence of user manipulations of the electronic puzzle required to access the inner chamber.

Example 70 includes the subject matter of any of Examples 64-69, and wherein determining the one or more user inputs comprises determining a combination of user manipulations of the electronic puzzle required to access the inner chamber.

Example 71 includes the subject matter of any of Examples 64-70, and further including storing the puzzle password in a memory of the password administration server.

Example 72 includes the subject matter of any of Examples 64-71, and wherein the inner chamber is a first inner chamber; and further comprising determining, by the password administration server, another one or more user inputs required from the user's manipulation of the electronic puzzle to access a second inner chamber of the electronic puzzle.

Example 73 includes the subject matter of any of Examples 64-72, and wherein the second inner chamber is inaccessible without access to the first inner chamber.

Example 74 includes the subject matter of any of Examples 64-73, and wherein determining the one or more user inputs required from a user's manipulation of the electronic puzzle to access an inner chamber of the electronic puzzle comprises receiving data indicative of a puzzle creator's prior manipulation of the electronic puzzle.

Example 75 includes a computing device comprising a processor; and a memory having stored therein a plurality of instructions that when executed by the processor cause the computing device to perform the method of any of Examples 64-74.

Example 76 includes one or more machine-readable storage media comprising a plurality of instructions stored thereon that in response to being executed result in a computing device performing the method of any of Examples 64-74.

Example 77 includes a computing device comprising means for performing the method of any of Examples 64-74.

Example 78 includes a password administration server of determining a password for an electronic puzzle, the password administration server comprising means for determining one or more user inputs required from a user's manipulation of the electronic puzzle to access an inner chamber of the electronic puzzle; means for generating a puzzle password based on the one or more user inputs; and means for transmitting the puzzle password to a computing system of the electronic puzzle.

Example 79 includes the subject matter of Example 78, and further including means for determining one or more non-user inputs required to access the inner chamber; and wherein the means for generating the puzzle password comprises means for generating the puzzle password based on the one or more user inputs and the one or more non-user inputs.

Example 80 includes the subject matter of any of Examples 78 and 79, and wherein the means for determining the one or more non-user inputs comprises means for determining a time period during which the puzzle password is to be performed.

Example 81 includes the subject matter of any of Examples 78-80, and wherein the means for determining the one or more non-user inputs comprises means for determining a geographical location at which the puzzle password is to be performed.

Example 82 includes the subject matter of any of Examples 78-81, and wherein the means for determining the one or more user inputs comprises means for receiving a selection of the one or more user inputs from a user of the password administration server.

Example 83 includes the subject matter of any of Examples 78-82, and wherein the means for determining the one or more user inputs comprises means for determining a sequence of user manipulations of the electronic puzzle required to access the inner chamber.

Example 84 includes the subject matter of any of Examples 78-83, and wherein the means for determining the one or more user inputs comprises means for determining a combination of user manipulations of the electronic puzzle required to access the inner chamber.

Example 85 includes the subject matter of any of Examples 78-84, and further including means for storing the puzzle password in a memory of the password administration server.

Example 86 includes the subject matter of any of Examples 78-85, and wherein the inner chamber is a first inner chamber; and further comprising means for determining another one or more user inputs required from the user's manipulation of the electronic puzzle to access a second inner chamber of the electronic puzzle.

Example 87 includes the subject matter of any of Examples 78-86, and wherein the second inner chamber is inaccessible without access to the first inner chamber.

Example 88 includes the subject matter of any of Examples 78-87, and wherein the means for determining the one or more user inputs required from a user's manipulation of the electronic puzzle to access an inner chamber of the electronic puzzle comprises means for receiving data indicative of a puzzle creator's prior manipulation of the electronic puzzle.

The invention claimed is:

1. A computing system of an electronic puzzle, the computing system comprising:
a memory;
an electronically controlled lock;
a plurality of sensors to generate sensor data, wherein the plurality of sensors include a first sensor to generate sensor data indicative of a first physical manipulation of the electronic puzzle and a second sensor to generate sensor data indicative of a second physical manipulation of the electronic puzzle different from the first physical manipulation, and wherein the first sensor is of a sensor type different from the second sensor;
a lock control circuitry to control the electronically controlled lock to regulate access to an inner chamber of the electronic puzzle;
an input monitoring circuitry to monitor the sensor data generated by the plurality of sensors;
a password verification circuitry to (i) generate an input password based on the monitored sensor data and (ii) compare the input password to a puzzle password stored in the memory; and
a display positioned within the inner chamber to display a unique identifier in response to a determination that the electronically controlled lock has been unlocked;
wherein the lock control circuitry is further to unlock the electronically controlled lock to permit access to the inner chamber in response to a determination that the input password matches the puzzle password.

2. The computing system of claim 1, wherein the electronically controlled lock comprises at least one of a solenoid, a shape-changing material, or an electromagnet.

3. The computing system of claim 1, further comprising a communication circuitry to receive the puzzle password from a password administration server,
wherein to monitor the sensor data comprises to monitor the sensor data in response to receipt of the puzzle password.

4. The computing system of claim 1, further comprising a communication circuitry to receive at least one of sensor data or user physical manipulations data from a computing device communicatively coupled to the computing system and in a vicinity of the electronic puzzle;
wherein to generate the input password comprises to generate the input password based on the at least one of the sensor data or the user physical manipulations data.

5. The computing system of claim 1, wherein to monitor the sensor data comprises to monitor at least one of a sequence or a combination of generated sensor data that results from a user's manipulation of the electronic puzzle.

6. The computing system of claim 1, wherein the plurality of sensors comprises at least one of an inertial sensor, a microphone, a pressure sensor, or a light sensor.

7. The computing system of claim 1, wherein to monitor the sensor data comprises to determine whether the electronic puzzle is located near another electronic puzzle; and
wherein to generate the input password comprises to generate the input password based on the determination of whether the electronic puzzle is located in proximity with the another electronic puzzle.

8. The computing system of claim 1, wherein the electronically controlled lock comprises a first electronically controlled lock to regulate access to a first inner chamber of the electronic puzzle; and
further comprising a second electronically controlled lock to regulate access to a second inner chamber of the electronic puzzle.

9. The computing system of claim 8, wherein the second inner chamber is inaccessible without access to the first inner chamber.

10. The computing system of claim 1, further comprising a communication circuitry to transmit a notification message to a password administration server in response to a determination that the electronically controlled lock has been unlocked.

11. One or more non-transitory, machine-readable storage media comprising a plurality of instructions stored thereon that, in response to execution by a computing system of an electronic puzzle, cause the computing system to:
monitor sensor data generated by a plurality of sensors of the computing system, wherein the sensor data includes first sensor data generated by a first sensor of the plurality of sensors indicative of a first physical manipulation of the electronic puzzle and second sensor data generated by a second sensor of the plurality of sensors indicative of a second physical manipulation of the electronic puzzle different from the first physical manipulation, and wherein the first sensor is of a sensor type different from the second sensor;
generate an input password based on the monitored sensor data;
compare the input password to a puzzle password stored in a memory of the computing system;
unlock an electronically controlled lock of the electronic puzzle to permit access to an inner chamber of the electronic puzzle in response to a determination that the input password matches the puzzle password; and
display a unique identifier within the inner chamber in response to a determination that the electronically controlled lock has been unlocked.

12. The one or more non-transitory, machine-readable storage media of claim 11, wherein the plurality of instructions further cause the computing system to report a current status of the electronic puzzle to a password administration server.

13. The one or more non-transitory, machine-readable storage media of claim 11, wherein to unlock the electronically controlled lock comprises to unlock a first electronically controlled lock to permit access to a first inner chamber of the electronic puzzle; and
wherein the plurality of instructions further cause the computing system to unlock a second electronically controlled lock of the electronic puzzle to permit access to a second inner chamber of the electronic puzzle.

14. The one or more non-transitory, machine-readable storage media of claim 13, wherein the second inner chamber is inaccessible without access to the first inner chamber.

15. The one or more non-transitory, machine-readable storage media of claim 13, wherein to monitor the sensor data comprises to determine a context of the electronic puzzle.

16. A password administration server for determining a password for an electronic puzzle, the password administration server comprising:
- a user interface circuitry to determine a set of user physical manipulations of the electronic puzzle required to access an inner chamber of the electronic puzzle, wherein the set of user physical manipulations includes a first user physical manipulation of the electronic puzzle and second user physical manipulation of the electronic puzzle different from the first user physical manipulation;
- a password generation circuitry to generate a puzzle password based on the set of user physical manipulations; and
- a communication circuitry to transmit the puzzle password to a computing system of the electronic puzzle and a unique identifier that is to be displayed within the inner chamber in response to determination that the electronically controlled lock has been unlocked.

17. The password administration server of claim 16, wherein the user interface circuitry is further to determine one or more non-user physical manipulations required to access the inner chamber; and
  wherein the password generation circuitry is to generate the puzzle password based on the one or more user physical manipulations and the one or more non-user physical manipulations.

18. The password administration server of claim 17, wherein to determine the one or more non-user physical manipulations comprises to determine a time period during which the puzzle password is to be performed.

19. The password administration server of claim 17, wherein to determine the one or more non-user physical manipulations comprises to determine a geographical location at which the puzzle password is to be performed.

20. The password administration server of claim 16, wherein to determine the one or more user physical manipulations comprises to receive a selection of the one or more user physical manipulations from a user of the password administration server.

21. The password administration server of claim 16, wherein to determine the one or more user physical manipulations comprises to determine at least one of a sequence or a combination of user manipulations of the electronic puzzle required to access the inner chamber.

22. The password administration server of claim 16, wherein the inner chamber is a first inner chamber; and
  wherein the user interface circuitry is further to determine another one or more user physical manipulations required from the user's manipulation of the electronic puzzle to access a second inner chamber of the electronic puzzle.

23. The password administration server of claim 22, wherein the second inner chamber is inaccessible without access to the first inner chamber.

24. The password administration server of claim 16, wherein to determine the one or more user physical manipulations required from a user's manipulation of the electronic puzzle to access an inner chamber of the electronic puzzle comprises to receive data indicative of a puzzle creator's prior manipulation of the electronic puzzle.

* * * * *